Figure 1:
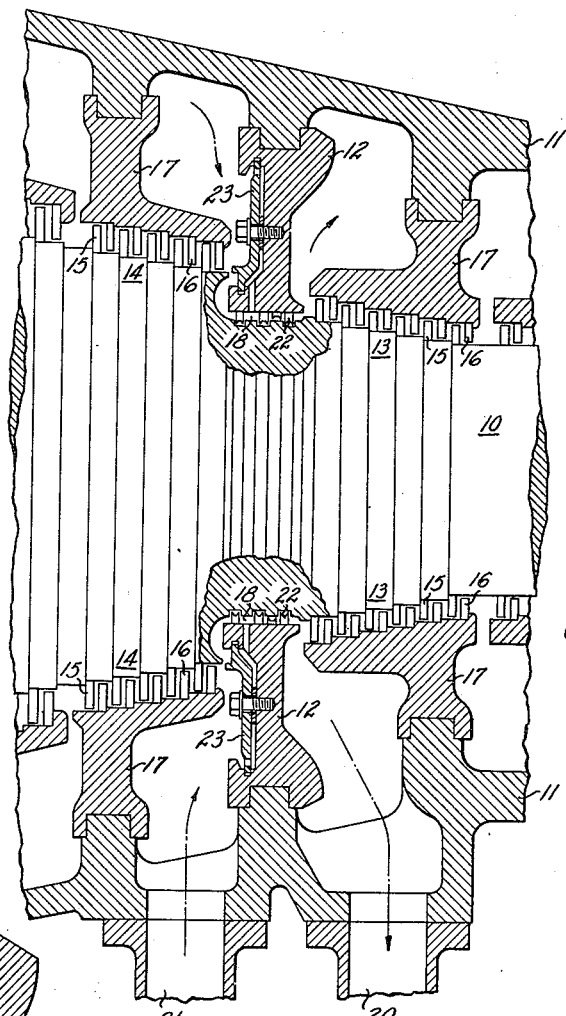

April 3, 1951            C. D. WILSON            2,547,300

DIAPHRAGM FOR REHEAT ELASTIC FLUID TURBINES

Filed May 26, 1949

Inventor
Charles D. Wilson
by Wayne B. Easton
Attorney

Patented Apr. 3, 1951

2,547,300

UNITED STATES PATENT OFFICE 2,547,300

DIAPHRAGM FOR REHEAT ELASTIC FLUID TURBINES

Charles D. Wilson, West Allis, Wis., assignor to Allis-Chalmers Manufacturing Company, Milwaukee, Wis., a corporation of Delaware Application May 26, 1949, Serial No. 95,464

7 Claims. (Cl. 60—73)

The present invention relates to elastic fluid turbines of the reheat type in which a diaphragm separates adjacent energy abstraction stages and the reheating of the fluid occurs between these stages. The principal object of the invention is to provide new and improved turbines of the reheat type.

In turbines of the above referred to type, fluid is withdrawn from a higher pressure stage, reheated externally of the cylinder and returned to a lower pressure stage. The diaphragm separating these stages is ordinarily subjected to a higher temperature on the lower pressure stage side, due to the reheated fluid coming in contact therewith, than on the higher pressure stage side and is thus subject to distortion.

Another object of the invention is to prevent distortion of a reheat turbine diaphragm due to unequal temperatures on opposite sides thereof.

Another object is to maintain substantially equal temperatures on both sides of a reheat turbine diaphragm to prevent warping of the diaphragm.

Another object is to utilize fluid leaking through the packing between the shaft and diaphragm of a reheat turbine to perform a useful function.

Other objects will appear hereinafter as the description of the invention proceeds.

The novel features of the invention and how the objects are obtained will appear more fully from this specification and the accompanying drawing showing one embodiment of the invention and forming a part of this application, and all of these novel features are intended to be pointed out in the claims.

Figure 2:
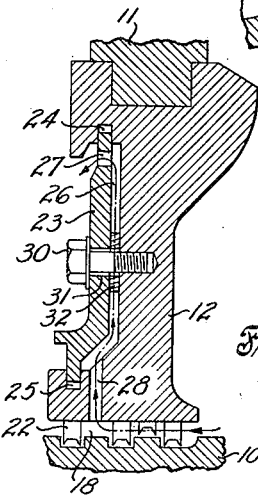

Referring to the drawing:

Fig. 1 is a fragmentary, longitudinal, sectional view of an elastic fluid turbine embodying the invention; and Fig. 2 is an enlarged detail sectional view of the upper part of the diaphragm shown in Fig. 1.

In the drawing, a reheat elastic fluid turbine includes a spindle or shaft 10 rotatably mounted in a cylinder 11, which comprises upper and lower halves adapted to be secured together. Within the cylinder 11 and supported thereby is a diaphragm 12 of ring construction, comprising halves adapted to be secured together, which encompass the shaft 10.

Energy abstraction stages, herein referred to as a higher pressure stage 13 and a lower pressure stage 14, each comprise moving blades 15 attached to the shaft 10 and stationary blades 16 supported by the cylinder by means of blade rings 17.

The diaphragm 12 separates the two stages 13, 14 within the cylinder, and the elastic fluid from the discharge end of the higher pressure stage 13 flows through a discharge passage 20 to a reheater (not shown). An inlet passage 21 leads the reheated fluid from the reheater to the inlet end of the lower pressure stage 14. A packing, herein shown as a series of labyrinth seals 22, between the inner periphery of the diaphragm 12 and shaft 10, forms a passageway 18 which retards leakage of elastic fluid between said stages. It will be understood that the joint between the outer periphery of the diaphragm 12 and the cooperating part of the cylinder may be of any desired form to stop leakage and permit relative expansion of the parts, and that the usual centering pins (not shown) may be provided. The arrangement so far described is typical of reheat turbine constructions.

It is to be noted that in a typical reheat turbine the diaphragm between reheat stages is subjected to relatively cooler fluid on the higher pressure stage side than on the lower pressure stage side which is in contact with the reheated fluid. Especially in instances in which the reheated fluid has a temperature of the order 900 to 1000° F. or more, the resulting temperature differential on opposite sides of the diaphragm sets up thermal stresses therein which tend to warp the diaphragm and which may cause objectionable leakage and/or rubbing at the means for sealing the shaft with respect to the inner periphery of the diaphragm or binding between the outer periphery of the diaphragm and the cylinder of the turbine. To avoid the disadvantageous effects of unequal temperatures in adjacent stages where the elastic fluid is reheated between such stages I provide means for maintaining substantially equal temperatures on both sides of the diaphragm. In general, this is accomplished by providing jacketing means on the lower pressure stage side through which a fluid cooler than the reheated fluid may be circulated.

Such jacketing means is herein shown as an annular shield plate 23 located on the lower pressure stage side of the diaphragm 12. The diaphragm 12 is herein shown (see Fig. 2) with an axially extending recess, the outer and inner axially extending walls of which are provided with circumferential slots 24 and 25, respectively, for receiving the outer and inner peripheries, respectively, of the plate 23. The plate 23 is formed in halves, and the plate and the slots 24, 25 are relatively so constructed and arranged that an annular space 26 is formed between the plate 23 and the opposing face of the diaphragm 12. The plate 23 is maintained coaxial with the diaphragm 12 by means of bolts 30 which pass through circumferentially spaced bores 31 in the plate 23 and spacer washers 32 and are threaded into the diaphragm. Radial clearances are provided between the outer and inner peripheries of the plate 23 and bottoms of the slots 24 and 25, respectively, to allow the shield plate 23 to expand and contract radially relative to the diaphragm 12.

There are circumferentially spaced ports 27 near the outer periphery of the plate 23. Radially inner parts of the space 26 communicate, through radial ports 28 in the diaphragm 12, with the annular passageway 18 such that at least a portion of the leakage fluid from the cooler, and higher pressure side of the diaphragm 12, after passing a series of labyrinth seals 22, enters the space 26 between the shield plate 23 and diaphragm, flows through the ports 27 and mixes with the entering reheated fluid. By this means, the two sides of the diaphragm are maintained at substantially the same temperature which minimizes any tendency to warp. The larger temperature difference occurs over the relatively thin shield plate 23 which may expand and contract radially relative to the diaphragm 12 as shown above.

Various modifications in structure may be made without deviating from the spirit of the invention. It is obvious, for example, that the shield plate 23 need not be supported by the diaphragm 12 but can be supported in any other suitable way; also the cooling fluid need not be fed to the space 26 from the higher pressure stage but may be fed from any other suitable source. It is also clear that the cooling fluid, if fed from the higher pressure stage, need not be fed to the space 26 through the sealing passage 18, but may be fed from the higher pressure stage in any other suitable way. It will be understood, however, that the illustrated embodiment has advantages over the hereinbefore mentioned variants.

From the foregoing it will be apparent to those skilled in the art that the illustrated embodiment of the invention provides a new and improved device for preventing the disadvantageous effects of unequal temperatures in adjacent stages of an elastic fluid turbine, where the fluid is reheated between these stages, and accordingly accomplishes the objects of the invention. On the other hand, it will also be obvious to those skilled in the art that the illustrated embodiment of the invention may be variously changed and modified, as shown above, and accordingly the disclosure herein is illustrative only, and the invention is not limited thereto.

It is claimed and desired to secure by Letters Patent:

1. In an elastic fluid turbine of the type in which the elastic fluid is withdrawn from a higher pressure stage, reheated, and returned to an adjacent lower pressure stage and having a diaphragm separating said stages, the combination with said diaphragm of jacketing means on the lower pressure stage side thereof through which a fluid cooler than said reheated fluid may be circulated during operation to maintain the temperature of the lower pressure stage wall of said diaphragm below the temperature of said reheated fluid.

2. In an elastic fluid turbine of the type in which the elastic fluid is withdrawn from a higher pressure stage, reheated, and returned to an adjacent lower pressure stage and having a diaphragm separating said stages, the combination with said diaphragm on the lower pressure stage side thereof of a shielding member such that a space is formed therebetween through which a fluid may be circulated during operation to maintain the temperature of the lower stage wall of the diaphragm below the temperature of the reheated fluid, said shielding member being free to expand and contract radially relative to said diaphragm.

3. In an elastic fluid turbine of the type in which the elastic fluid is withdrawn from a higher pressure stage, reheated, and returned to an adjacent lower pressure stage and having a diaphragm separating said stages, a shield member secured to said diaphragm on the lower pressure stage side thereof in such a manner that a space is formed therebetween through which a fluid may be circulated during operation to maintain the temperature of the lower pressure stage wall of the diaphragm below the temperature of the reheated fluid, said shielding member being free to expand and contract radially relative to said diaphragm.

4. In an elastic fluid turbine of the type in which the elastic fluid is withdrawn from a higher pressure stage, reheated, and returned to an adjacent lower pressure stage and having a diaphragm separating said stages, the combination with said diaphragm on the lower pressure stage side thereof of a shielding member such that a space is formed therebetween through which a portion of the relatively cooler fluid from the opposite side of said diaphragm is circulated during operation to maintain the temperature of the lower pressure stage wall of the diaphragm below the temperature of the reheated fluid, said shielding member being free to expand and contract radially relative to said diaphragm.

5. In an elastic fluid turbine of the type in which the elastic fluid is withdrawn from a higher pressure stage, reheated, and returned to an adjacent lower pressure stage and having a diaphragm separating said stages, having in combination, a shaft, sealing means between the diaphragm and the shaft defining a passageway, a shield member disposed on the lower pressure stage side of said diaphragm such that an annular space is formed therebetween which connects with said passageway such that at least a portion of the relatively cooler fluid leaking through said passageway circulates through said space during operation to maintain the temperature of the lower pressure stage wall of the diaphragm below the temperature of the reheated fluid, said shield member being free to expand and contract radially relative to said diaphragm.

6. In an elastic fluid turbine of the type in which the elastic fluid is withdrawn from a higher pressure stage, reheated, and returned to an adjacent lower pressure stage and having a diaphragm separating said stages, having in combination, a shaft, sealing means between the diaphragm and the shaft defining a passageway, a shield member disposed on the lower pressure stage side of said diaphragm such that a space is formed therebetween, channel means in said diaphragm connecting said space and said passageway such that at least a portion of the relatively cooler fluid leaking through said sealing means circulates through said space during operation to maintain the temperature of the lower pressure stage wall of the diaphragm below the temperature of the reheated fluid, said shield member being free to expand and contract radially relative to said diaphragm.

7. In an elastic fluid turbine of the type in which the elastic fluid is withdrawn from a higher pressure stage, reheated, and returned to an adjacent lower pressure stage and having a diaphragm separating said stages, having in combination, a shaft, sealing means between the diaphragm and the shaft defining a passageway, a shield member disposed on the lower pressure stage side of said diaphragm such that a space is formed therebetween, channel means in said diaphragm connecting said space and said passageway and ports in the radially outer portions of said shield member such that at least a portion of the relatively cooler fluid leaking through said sealing means circulates through said space during operation to maintain the temperature of the lower pressure stage wall of the diaphragm below the temperature of the reheated fluid, said shield member being free to expand and contract radially relative to said diaphragm.

CHARLES D. WILSON.

REFERENCES CITED

The following references are of record in the file of this patent:

UNITED STATES PATENTS

| Number | Name | Date |
|---|---|---|
| 1,922,017 | Guy | Aug. 8, 1933 |